(12) United States Patent
Zhou et al.

(10) Patent No.: US 8,991,431 B2
(45) Date of Patent: Mar. 31, 2015

(54) MAGNETIC CONTROL MULTI-WAY VALVE

(75) Inventors: Huasong Zhou, Xiamen (CN); Haisong Peng, Xiamen (CN); Jianmin Chen, Xiamen (CN); Bin Chen, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 218 days.

(21) Appl. No.: 13/697,128

(22) PCT Filed: May 31, 2011

(86) PCT No.: PCT/CN2011/074938
§ 371 (c)(1),
(2), (4) Date: Nov. 9, 2012

(87) PCT Pub. No.: WO2011/150813
PCT Pub. Date: Dec. 8, 2011

(65) Prior Publication Data
US 2013/0061966 A1   Mar. 14, 2013

(30) Foreign Application Priority Data

Jun. 2, 2010   (CN) .......................... 2010 1 0190190
Jun. 2, 2010   (CN) ....................... 2010 2 0212763 U

(51) Int. Cl.
F16K 1/00     (2006.01)
F16K 17/04    (2006.01)
F16K 11/14    (2006.01)
(Continued)

(52) U.S. Cl.
CPC ............... *F16K 31/086* (2013.01); *F16K 11/22* (2013.01); *F16K 31/3835* (2013.01)

USPC ............. 137/883; 137/882; 137/862; 251/65

(58) Field of Classification Search
CPC ..... F16K 11/161; F16K 31/084; F16K 11/20; F16K 31/086
USPC ..................... 137/883, 637, 882, 862; 251/65
See application file for complete search history.

(56) References Cited

U.S. PATENT DOCUMENTS 3,480,040 A * 11/1969 Erickson ........................ 137/883
4,827,982 A *  5/1989 Inagaki ...................... 137/636.1
(Continued)

FOREIGN PATENT DOCUMENTS

CN       2196716 Y    5/1995
CN       2431445 Y    5/2001
(Continued)

*Primary Examiner* — Craig Schneider
*Assistant Examiner* — Michael R Reid
(74) *Attorney, Agent, or Firm* — Rabin & Berdo, P.C.

(57) ABSTRACT

A magnetic control multi-way valve has a fixed unit, at least two control valves and a second magnet. The fixed unit is provided with a inlet and at least two independent mounting cavities, an outlet is formed at the lower port of the mounting cavity; two control valves are mounted in the mounting cavities respectively; and the control valve comprises a spool assembly, a first magnet, a sealing gasket, a first spring and a second spring. The spool assembly is fixedly arranged in the mounting cavity with a pressure relief way; the first magnet which is connected in the mounting cavity in an up and down sliding manner and is above the spool assembly; the sealing gasket is connected in the mounting cavity in a vertical sliding manner and is below the spool assembly; the second magnet is connected out of the fixed unit in a horizontal sliding manner.

10 Claims, 11 Drawing Sheets

(51) Int. Cl.
*F16K 31/08* (2006.01)
*F16K 11/22* (2006.01)
*F16K 31/383* (2006.01)

(56) References Cited

U.S. PATENT DOCUMENTS

| | | |
|---|---|---|
| 5,230,365 A | 7/1993 | Woltz et al. |
| 6,109,301 A | 8/2000 | Pfetzer |
| 6,450,197 B1 | 9/2002 | Cardin |
| 6,460,367 B1 * | 10/2002 | DuHack .................. 62/337 |
| 7,222,642 B2 * | 5/2007 | DuHack et al. ........... 137/883 |

FOREIGN PATENT DOCUMENTS

| | | |
|---|---|---|
| CN | 201297404 Y | 8/2009 |
| CN | 201818879 U | 5/2011 |
| CN | 101846211 B | 7/2012 |

* cited by examiner

MAGNETIC CONTROL MULTI-WAY VALVE

FIELD OF THE INVENTION

The present invention relates to a multi-way valve, more particularly to a magnetic control multi-way valve.

BACKGROUND OF THE INVENTION

Most of the magnetic control valve at the prior art is magnetic valve which is controlled by power, it is needed to introduce additional power resource with big structure, the manufacturing and using cost of the magnetic valve based on this technology are large with power consumption.

SUMMARY OF THE INVENTION

The object of the present invention is to offer magnetic control multi-way valve which overcomes the defect of high cost with power consuming in the magnetic valve technology at the prior art.

The technical proposal used for solving the technical matter in the present invention is:

Magnetic control multi-way valve, it comprises:

A fixed unit, which is provided with a inlet and at least two independent mounting cavities, an outlet is formed at the lower port of the mounting cavity;

At least two control valves, which are mounted in the mounting cavities respectively; and each control valve comprises:

A spool assembly which is fixedly arranged in the mounting cavity with a pressure relief way;

A first magnet which is connected in the mounting cavity in an up and down sliding manner and is above the spool assembly, and the on or off of the pressure relief way is controlled through the up and down sliding of the first magnet;

A sealing gasket which is connected in the mounting cavity in an up and down sliding manner and is below the spool assembly, and the on or off of the communication between the outlet and the inlet cavity is controlled through the up and down sliding of the sealing gasket;

A first spring which is arranged between the sealing gasket and the spool assembly; and A second spring which is arranged between the first magnet and the spool assembly; and A second magnet which is connected out of the fixed unit in a horizontal sliding manner and the up and down sliding of the first magnet is controlled through the horizontal sliding of the second magnet.

In a preferred embodiment, an end cap adaptive to the pressure relief way is fixedly arranged under the first magnet.

In a preferred embodiment,

The fixed unit comprises a body and a upper cover which are fixedly connected to each other;

A first cavity is formed between the spool assembly and the seal gasket, and a second cavity is formed between the spool assembly and the upper cover;

A first water passing hole is opened on the sealing gasket, through which the inlet is communicated with the first cavity;

A pressure relief way penetrating up and down and a second water passing hole penetrating up and down are opened on the spool assembly, and the first cavity is communicated with the second cavity through the second water passing hole, and the second cavity is communicated with the outlet through the pressure relief way.

In a preferred embodiment, the second magnet is connected on the upper cover in a horizontal sliding manner, and the magnetic pole corresponding to the lower end face of the second magnet is opposite to the magnetic pole corresponding to the upper end face of the first magnet.

In a preferred embodiment, a guiding sleeve is arranged under the spool assembly, the upper end of the guiding sleeve is communicated with the pressure relief way, and the sealing gasket is hermetically sleeved out of the guiding sleeve in a sliding manner.

In a preferred embodiment, a fixing concave slot adaptive to the first spring is arranged on the sealing gasket, and the first spring is adaptively connected to the fixing concave slot, and the first spring is provided with a inserting end that is inserted into the first water passing hole.

In a preferred embodiment, a push button is connected on the upper cover in a horizontal sliding manner and is fixedly connected to the second magnet.

In a preferred embodiment, an upward step plane is arranged in the mounting cavity, to which the sealing gasket is corresponding.

In a preferred embodiment, a convex ring is convexly arranged on the step plane.

In a preferred embodiment, the number of the control valve is two, and the two control valves are respectively mounted in the two mounting cavities which are interval, horizontal, abreast and independent to each other.

In a preferred embodiment, the number of the control valve is three, and the three control valves are respectively mounted in three independent mounting cavities.

Compared with the technical proposal at the prior art, the benefits of the present invention are:

1 The up and down sliding of the first magnet is controlled through the horizontal sliding of the second magnet, and the on or off of the pressure relief way is controlled through the up and down sliding of the first magnet, and the up and down sliding of the sealing gasket is controlled through the on or off of the pressure relief way, and the on or off of the communication between the outlet and the inlet cavity is controlled through the up and down sliding of the sealing gasket, and then the waterway switch is achieved. It overcomes the defects at the prior and can generate following benefits: a compared with power control, it is provided with broader using environment without limits and with good safe performance; b it can save power with low cost of using and manufacturing, especially in the environmental protection society calling for energy saving and low carbon; c it is light and accurate to switch; d it is provided with the effect of magnetizing water which is provided with magical efficiency and broad applied range;

2 A fixing concave slot adaptive to the first spring is arranged on the sealing gasket, and the first spring is adaptively connected to the fixing concave slot, and the first spring is provided with a inserting end that is inserted into the first water passing hole. It can locate the first spring accurately with easy assembly;

3 A convex ring is convexly arranged on the step plane, sealing is achieved through the cooperation of the sealing gasket and the convex ring with good sealing performance.

DESCRIPTION OF THE PREFERRED EMBODIMENTS

Figure 1:
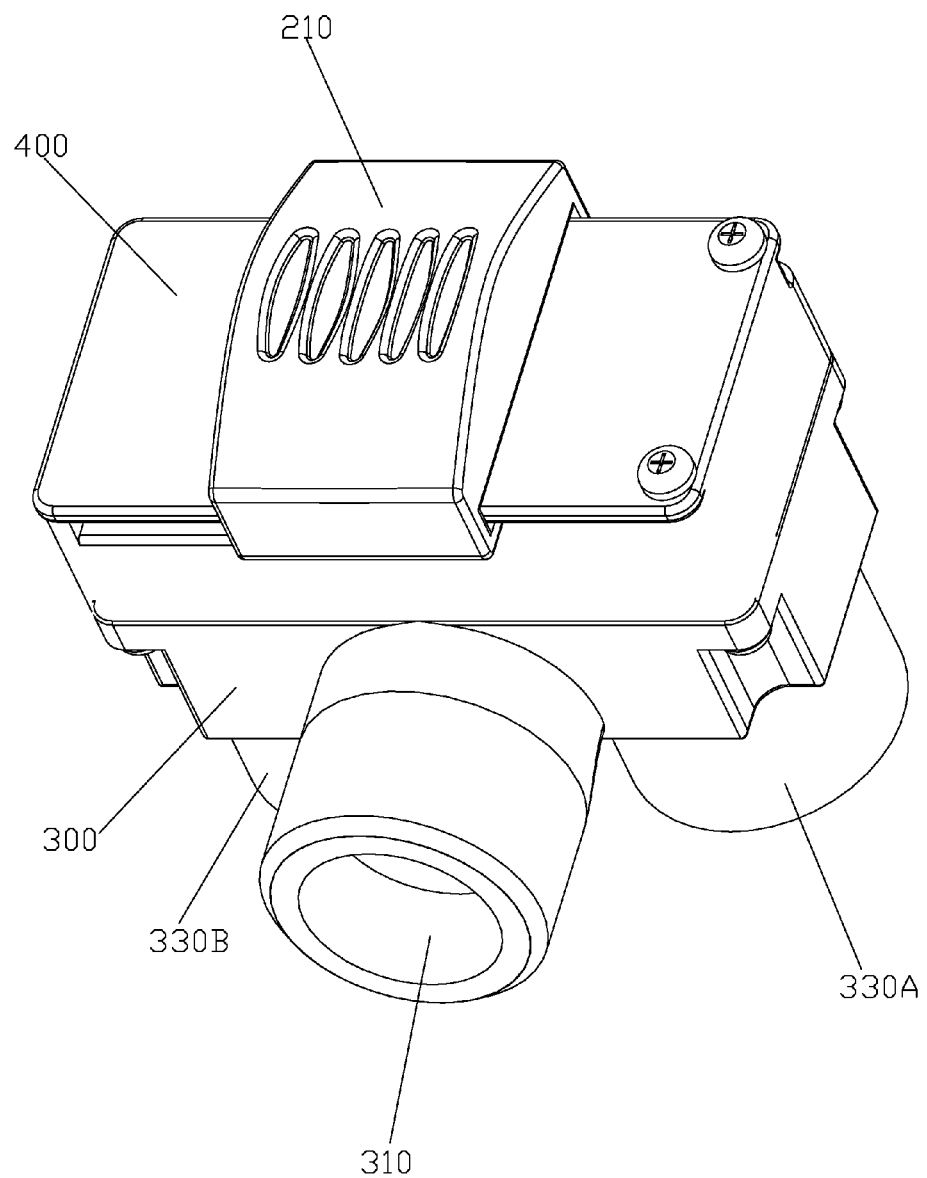
FIG. 1 shows the solid abridged general view of magnetic control two way valve of the preferred embodiment in the present invention.
Figure 2:
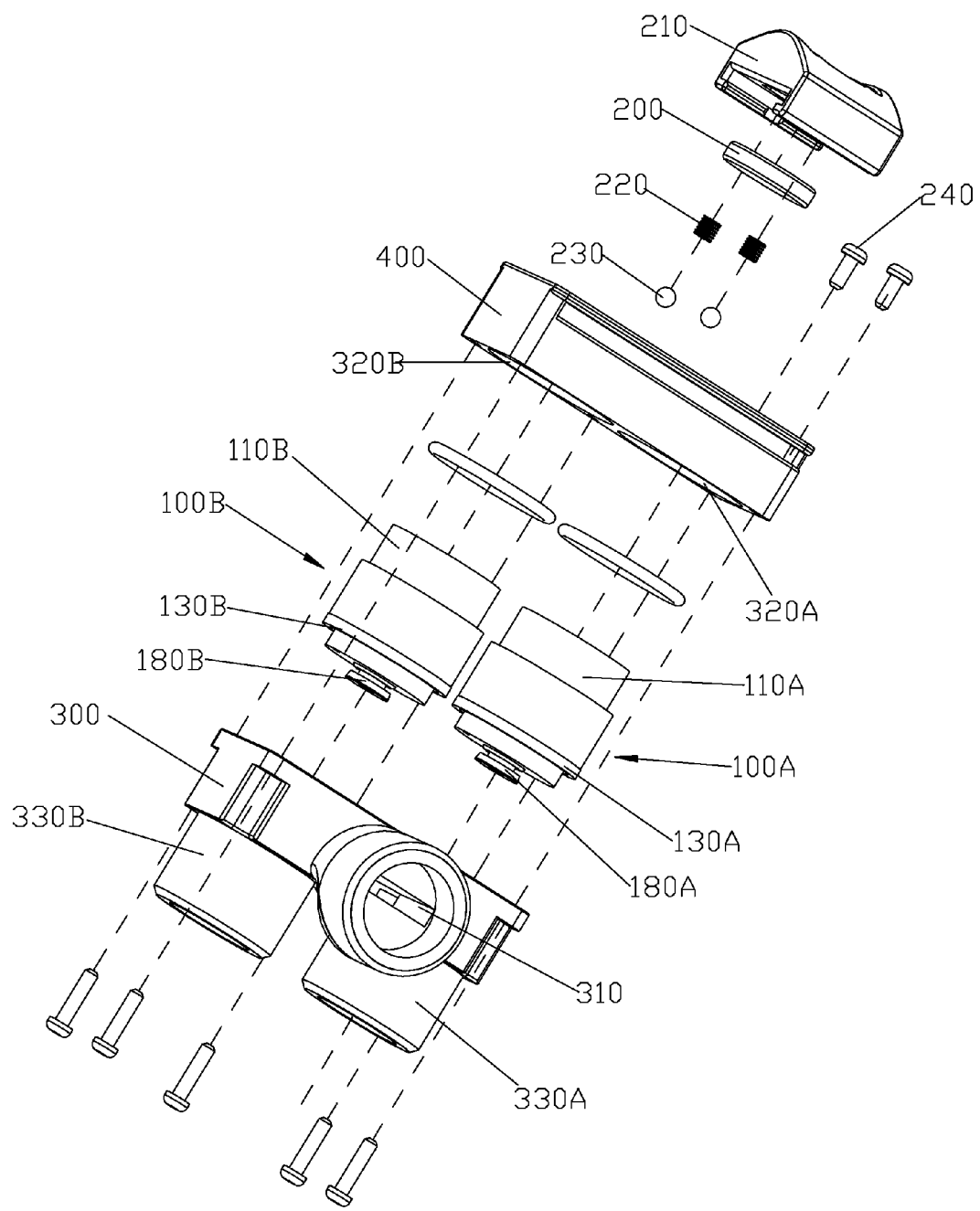
FIG. 2 shows the solid exploded view of magnetic control two way valve of the preferred embodiment in the present invention.
Figure 3:
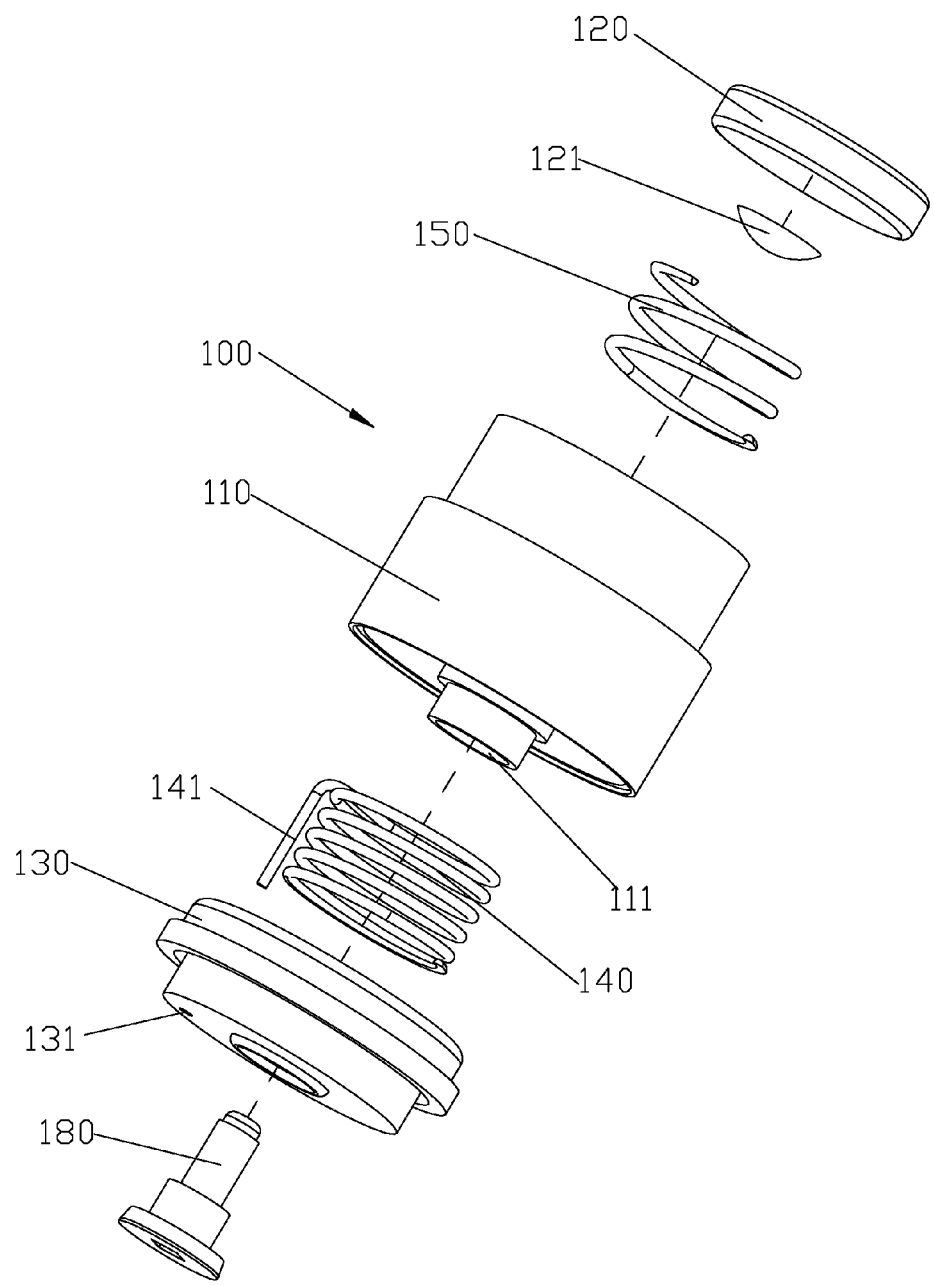
FIG. 3 shows the solid exploded view of the spool assembly of the magnetic control two way valve of the preferred embodiment in the present invention.
Figure 4A:
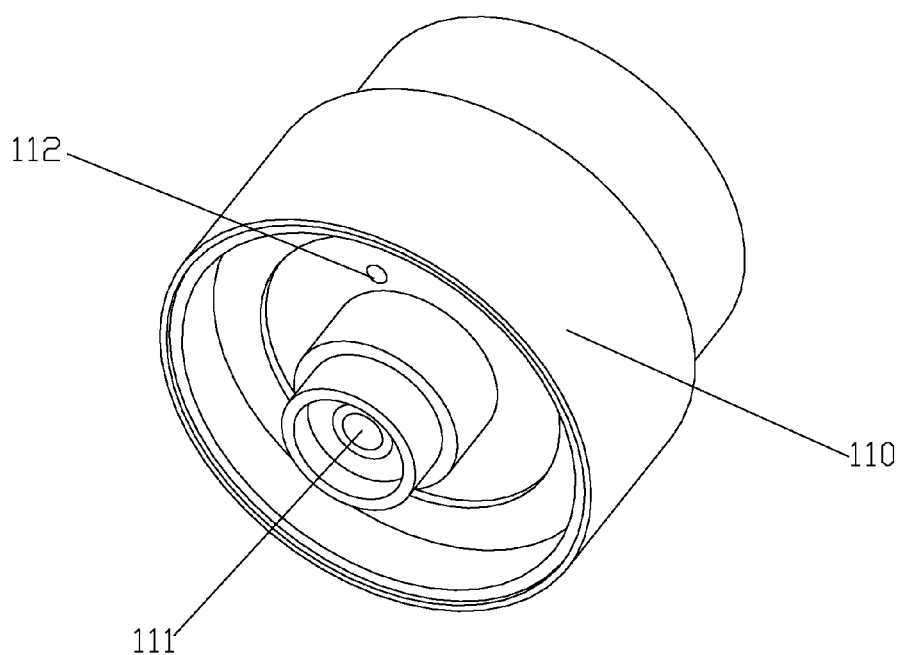
FIG. 4a shows the solid abridged general view of the body of the valve core of the magnetic control two way valve of the preferred embodiment in the present invention.
Figure 4B:
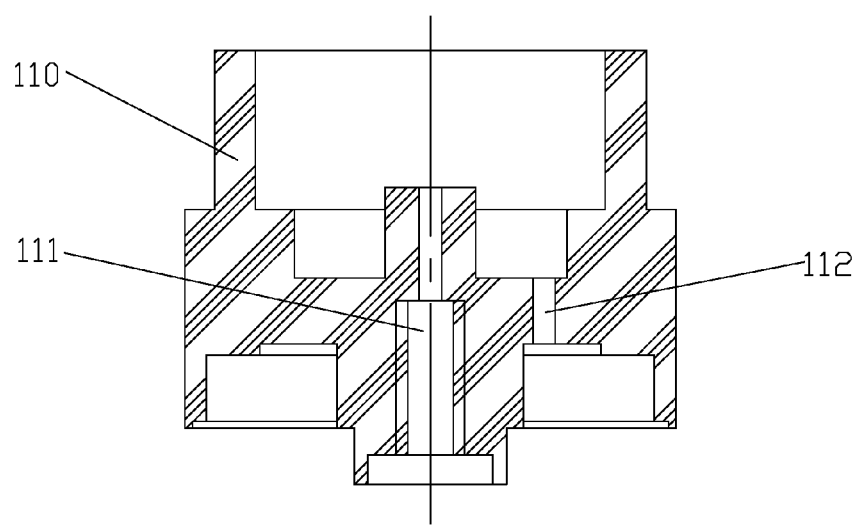
FIG. 4b shows the sectional view of the body of the valve core of the magnetic control two way valve of the preferred embodiment in the present invention.
Figure 4C:
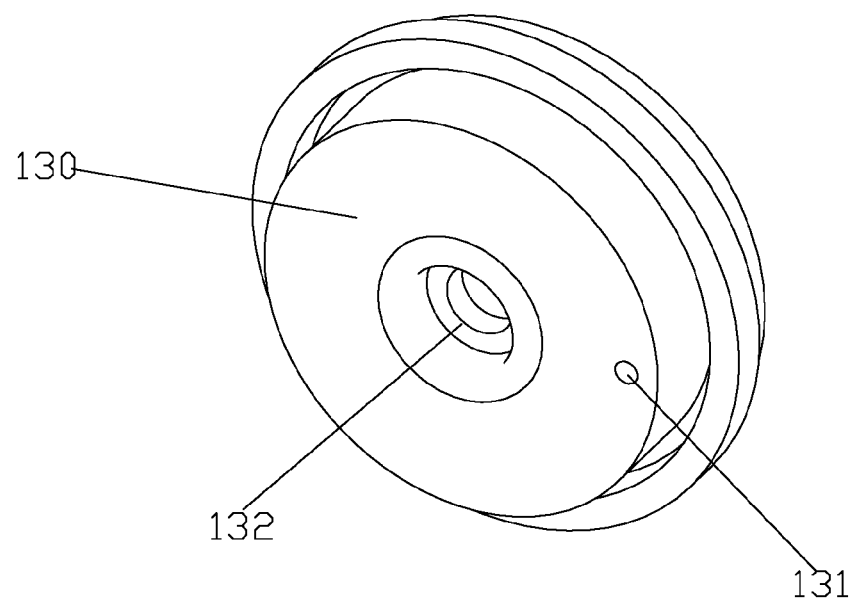
FIG. 4c shows the solid abridged general view of the sealing gasket of the magnetic control two way valve of the preferred embodiment in the present invention.
Figure 4D:
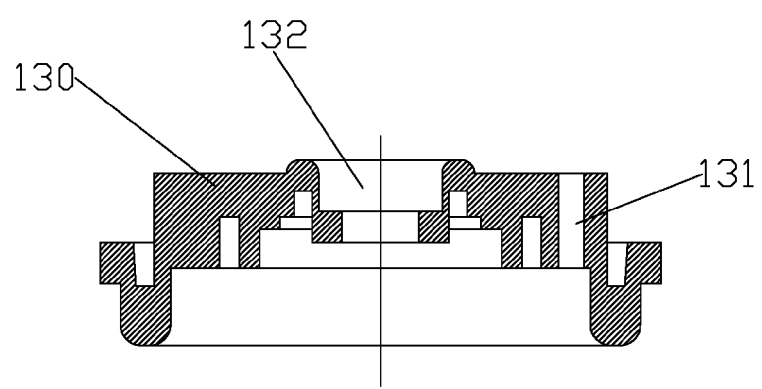
FIG. 4d shows the sectional view of the sealing gasket of the magnetic control two way valve of the preferred embodiment in the present invention.

With the following description of the drawings and specific embodiments, the invention shall be further described in details.

According to FIG. 1 to FIG. 7, the magnetic control multi-way valve comprises a fixed unit, two control valve 100, a second magnet 200.

The fixed unit comprises a body 300 and an upper cover 400. The body 300 and the upper cover 400 are hermetically and fixedly connected to each other, and so that the fixed unit is provided with a inlet 310 that can communicate with outside water resource and two mounting cavities 320 which are interval, horizontal, abreast and independent to each other, a outlet 330 is formed at the lower port of the mounting cavity 320, and it is better that the mounting cavity 320 and the outlet 330 are coaxial. In the present embodiment, an upward step plane is arranged in the mounting cavity 320, and a convex ring 340 is convexly arranged on the step plane. In the present embodiment, the two mounting cavities 320 are defined as the mounting cavity 320A and the mounting cavity 320B respectively, and the two outlets 330 are defined as the outlet 330A and the outlet 330B respectively.

The two control valves 100 are mounted in the two mounting cavities 320 respectively. The control valve 100 comprises a spool assembly 110, a first magnet 120, a sealing gasket 130, a first spring 140 and a second spring 150. The spool assembly 110 is fixedly mounted in the mounting cavity 320, the first magnet 120 can be connected in the mounting cavity 320 in a up and down sliding manner and be located under the spool assembly 110, the first spring 140 is arranged between the sealing gasket 130 and the spool assembly 110; the second spring 150 is arranged between the first magnet 120 and the spool assembly 110. The sealing gasket 130 is on the step plane of the mounting cavity 320 and correspondingly above the convex ring 340 of the mounting cavity 320. A first cavity 160 is formed between the spool assembly 110 and the sealing gasket 130, a second cavity 170 is formed between the spool assembly 110 and the upper cover 400.

A pressure relief way 111 penetrating up and down and a second water passing hole 112 penetrating up and down are opened on the spool assembly 110, and the first cavity 160 and the second cavity 170 are communicated with each other through the second water passing hole 112, and the second cavity 170 and the outlet 330 are communicated with each other through the pressure relief way 111. It is better that a water screw 180 is additionally screwed in the lower port of the pressure relief way 111 of the spool assembly 110, so that the pressure relief way 111 can communicate with the outlet 330 through the water screw 180 and the water screw 180 can guide the sealing gasket 130 (the central hole 132 of the sealing gasket 130 receives the water screw 180 in a sliding manner). A first water passing hole 131 penetrating up and down is opened on the sealing gasket 130, and is used for communicating the inlet 310 with the first cavity 160.

For ensuring the sealing performance, it is better that an end cap 121 adaptive to the pressure relief way is fixedly arranged under the first magnet 120.

For ensuring the accurate locating of the first spring 140 and easy assembly, it is better that a fixing concave slot adaptive to the first spring 140 is arranged on the sealing gasket 130, and the first spring 140 is adaptively connected to the fixing concave slot, and the first spring 140 is provided with a inserting end 141 which is inserted into the first water passing hole 131. For ensuring the accurate locating of the second spring 150 and easy assembly, it is better that a locating concave slot is concavely arranged on the upper end face of the spool assembly 110, and the second spring 150 is adaptively connected to the locating concave slot.

For easier understanding, the said two control valves 100 are defined as the control valve 100A and the control valve 100B respectively, corresponding parts of the two control valves are respectively defined, for example, the two spool assemblies 110 are defined as the spool assembly 110A and the spool assembly 110B respectively, the two first cavities 160 are defined as the first cavity 160A and the first cavity 160B. For better understanding the operation principle below, A and B are respectively used for distinguishing the two control valves and their corresponding structures in FIG. 1, FIG. 2, FIG. 5, FIG. 6 and FIG. 7, and their structures are virtually the same, so A and B are not distinguished when introducing the single control valve in FIG. 3 and FIG. 4.

The second magnet 200 can be connected on the upper cover 400 in a horizontal sliding manner, it is better that a push button 210, two third springs 220 and two ball plungers 230 are cooperated for ensuring the smooth horizontal sliding of the second magnet 200. The second magnet 200 is fixedly connected under the push button 210, a sliding slot is arranged on the left and the right side of the upper cover 400 respectively, and the left and the right sides of the push button 210 extends downward to from sliding block, the two sliding blocks are connected in the sliding slot in a sliding manner respectively to achieve connection relationship and guiding. The ball plunger and the third spring are cooperating together to turn the sliding friction to the rolling friction and to reduce the friction factor. For preventing the push button from sliding out of the upper cover, it is better that a limiting mechanism is additionally arranged.

In the present embodiment, the shapes of the second magnet 200 and the first magnet 120 are the same, and the magnetic pole corresponding to the lower end face of the second magnet is opposite to the magnetic pole corresponding to the upper end face of the first magnet.

Figure 5A:
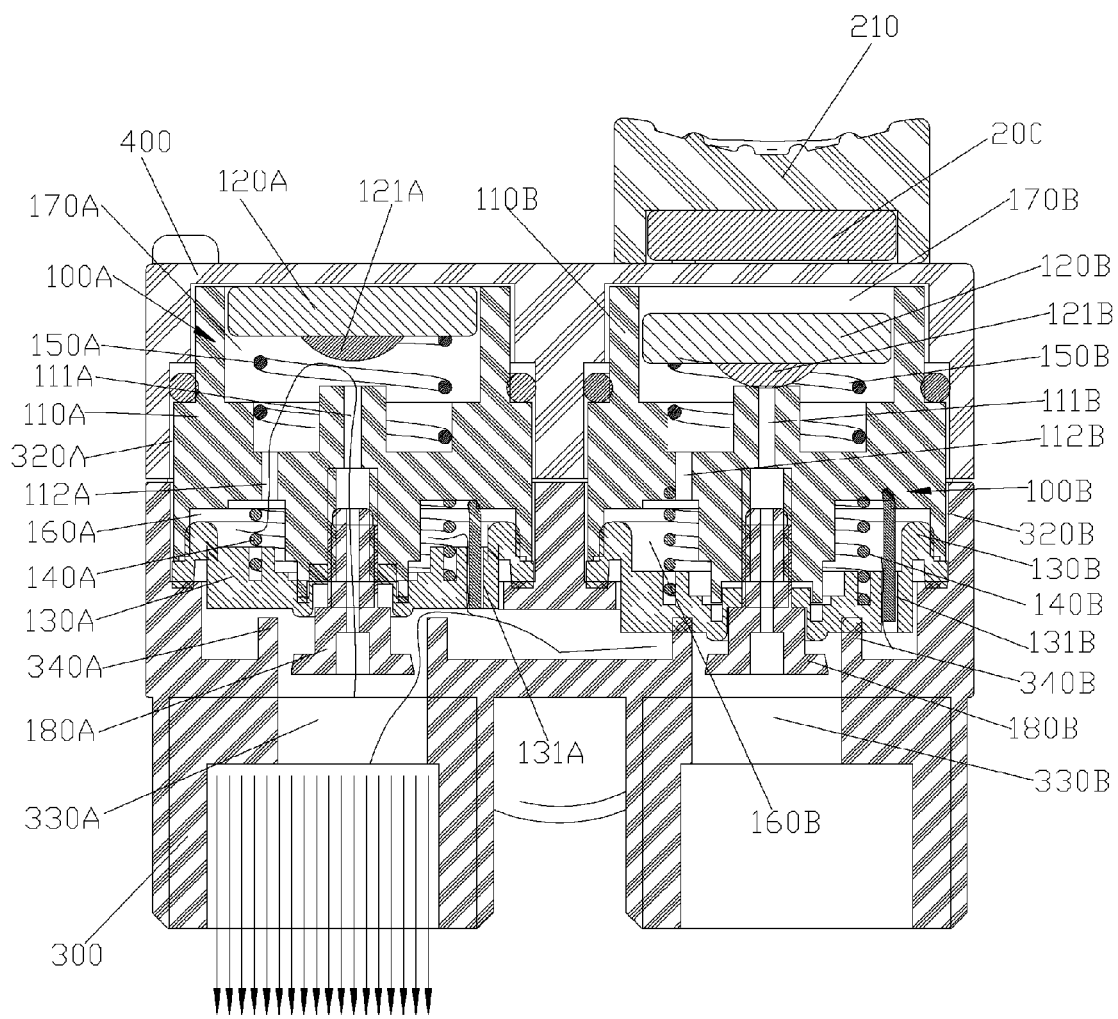
FIG. 5a shows the middle sectional view of the magnetic control two way valve of the preferred embodiment in the present invention, when the push button is right above the outlet B.
Figure 5B:
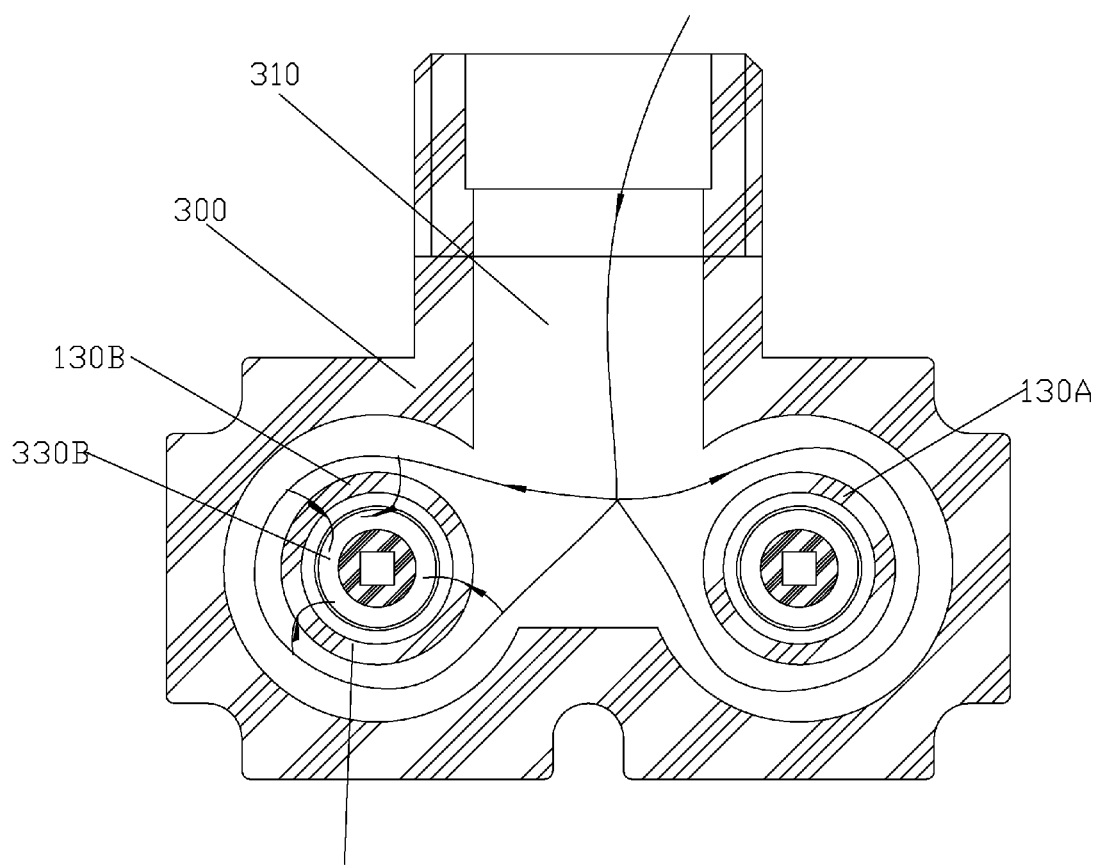
FIG. 5b shows the sectional view of FIG. 5a A-A.

As shown in FIG. 5, the push button 210 is right above the outlet 330B, after water fills the inlet through the inlet 310, water enters the first cavities 160A and 160B through the first water passing holes 131A and 131B after water fills the first cavities 160A and 160B, water enters the second cavities 170A and 170B through the second water passing holes 112A and 112B.

Because a magnetic pole is opposite above the first magnet 120B (the N pole of the first magnet 120B is against the N pole of the second magnet 200), repelling is generated, so that the end cap 121B is driven by the first magnet 120B to move downward to block the pressure relief opening of the first pressure relief way 111B, and then water cannot come out of the pressure relief opening of the first pressure relief way 111B, and then the water pressure in the first cavity 160B and the second cavity 170B is same to the water pressure in the inlet cavity; the sealing gasket 130B is against the below of the outlet 330B and connected to the outlet 330B when it is at original state under the action of the first spring 140B, and the pressure of the outlet 330B is same to atmosphere, so that the sealing gasket 130B is provided with a downward pressure difference to block the outlet 330B and stop water coming out of the outlet 330B;

Because no second magnet is present above the first magnet 120A, and the repelling force does not exist, the first magnet 120A moves upward under the action of the second spring 150B, and the pressure relief way 111A is on, so that the pressure of the first cavity 160A and the second cavity 170A are the same to the pressure of the outlet 330A (namely the pressure of atmosphere), then the pressure of the upper end of the sealing gasket 130A is lower than the pressure of the lower end, then the sealing gasket 130A moves upward to open the outlet 330A, then water comes out of the outlet 330A. Wherein, the force tolerance of the sealing gasket 130A is: $F1'-F2=(P1$ (the acting force that water pressure acts on the sealing gasket 130A$-P2$ (the acting force that atmosphere acts on the sealing gasket 130A))$*S-F2$(the elastic force of the first spring)$>0$.

Figure 6A:
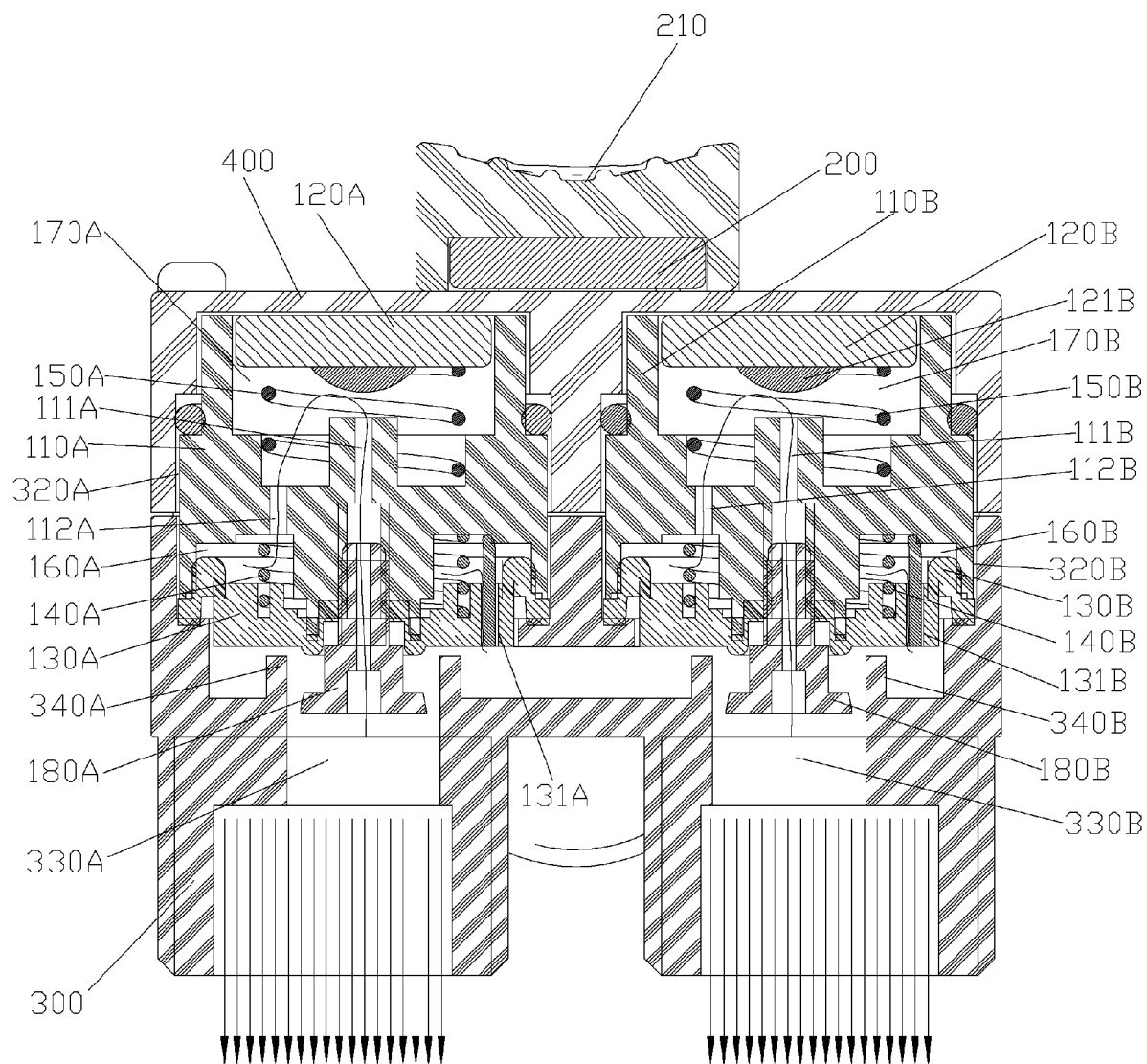
FIG. 6a shows the sectional view of the magnetic control two way valve of the preferred embodiment in the present invention, when the push button is at middle position.
Figure 6B:
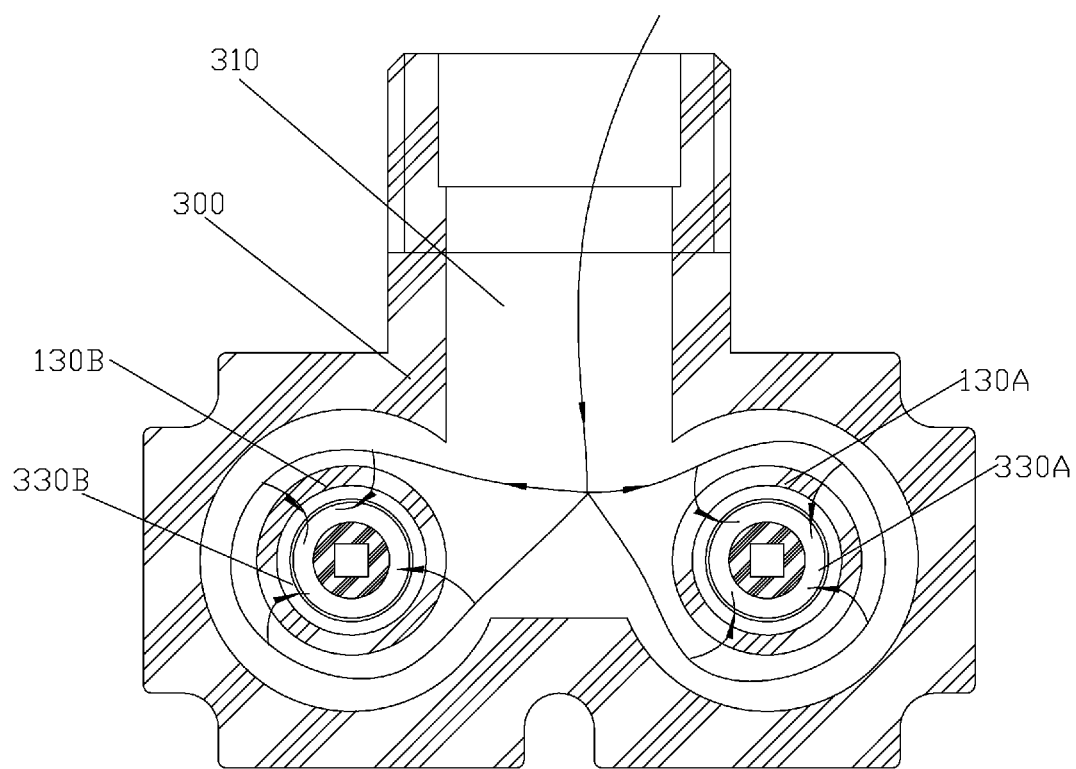
FIG. 6b shows the sectional view of FIG. 6a B-B.

As shown in FIG. 6, the push button is pushed to the middle position towards the left, the second magnet 200 leaves the first magnet 120B but does not get the first magnet 120A, the pressure relief openings of the pressure relief ways 111A and 111B are opened, it can get in a similar way that water comes out of the outlet 330A and 330B.

Figure 7A:
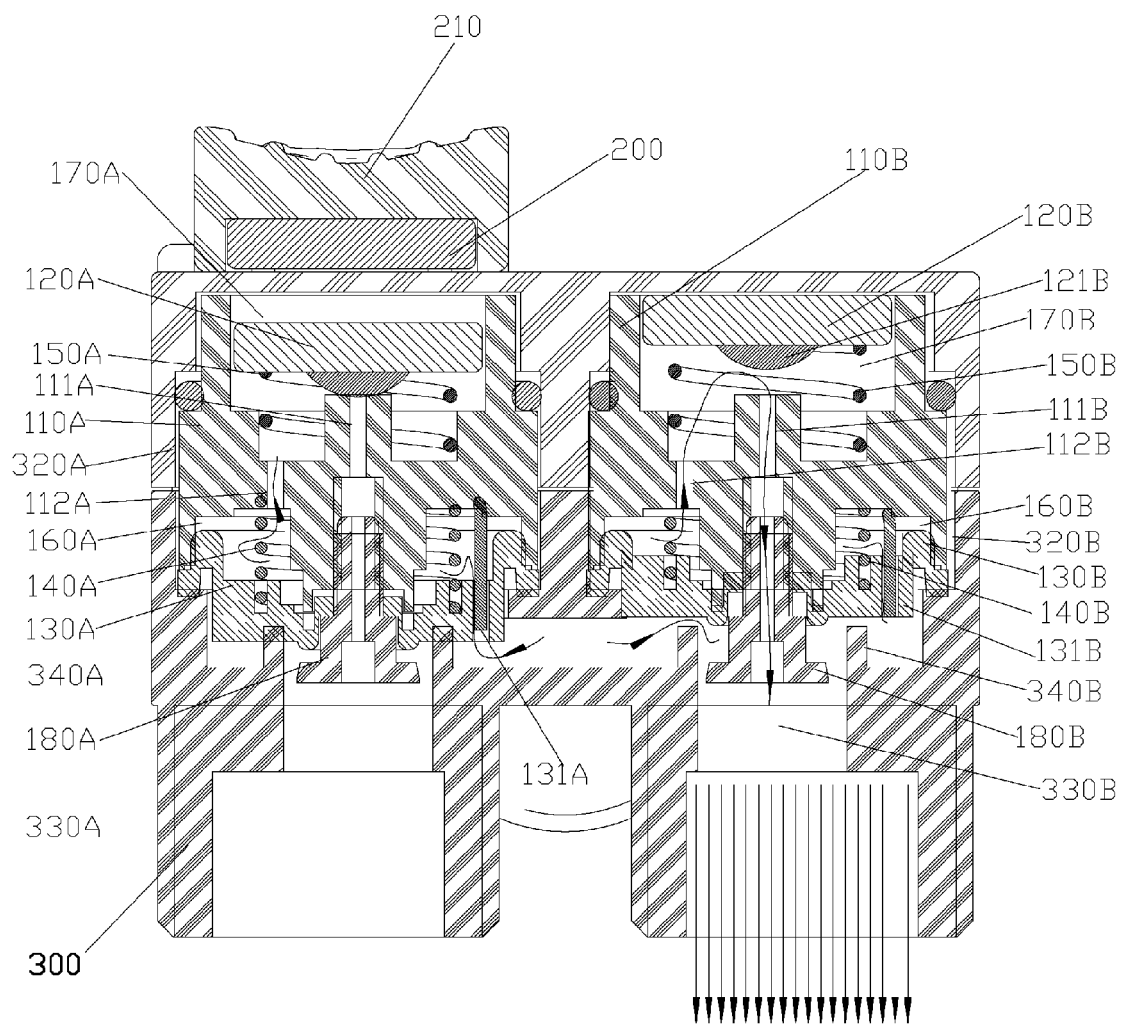
FIG. 7a shows the sectional view of the magnetic control two way valve of the preferred embodiment in the present invention, when the push button is right above the outlet A.
Figure 7B:
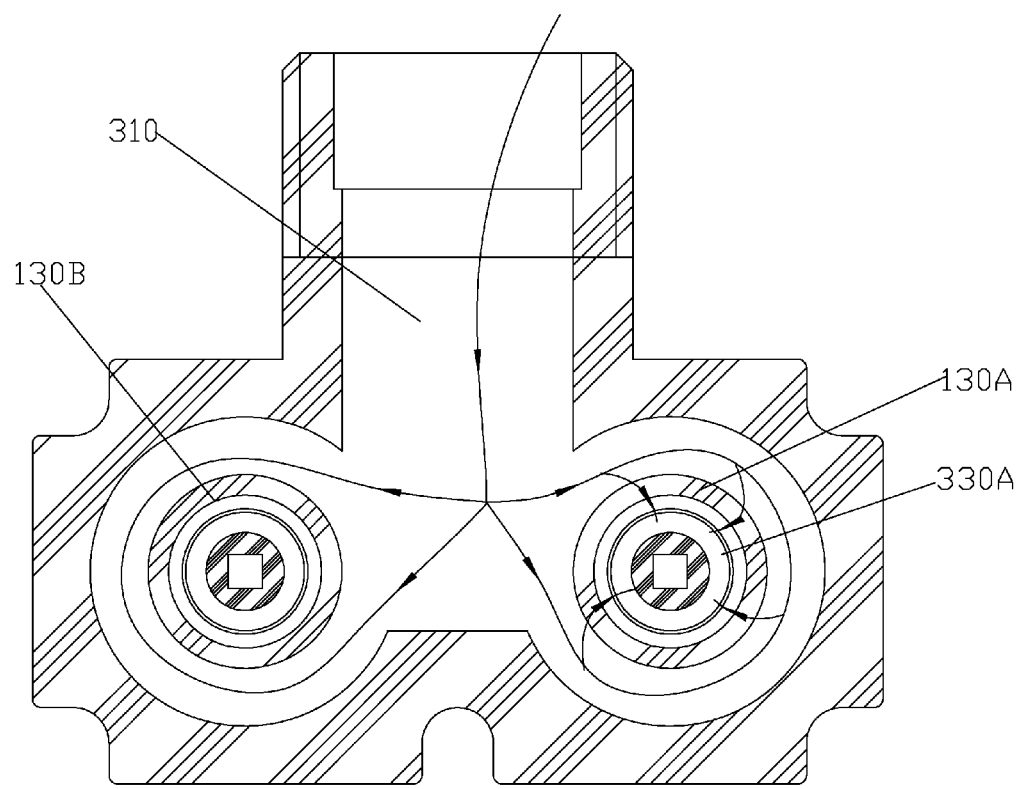
FIG. 7b shows the sectional view of FIG. 7a C-C.

As shown in FIG. 7, keep pushing the push button to far left, and the first magnet 120A but the first magnet 120B is repelled, it can get in a similar way that water comes out of the outlet 330B but outlet 330A.

The knob is pushed, and the process above repeats.

The two way valve is taken for example in the present embodiment, but it is not limited. And it can also fit the three way valve, for example, three control valves are arranged, the first magnets of the three control valves can be controlled to slide up and down through the sliding of the second magnets, so that the on or off of the outlets is achieved.

The present invention can be the magnetic control multi-way valve with three control valves which can be arranged along the same circumference and are mounted in three independent mounting cavities respectively; the shape of the second magnet is designed to be like a cashew nut; simultaneous controlling two control valves or controlling one control valve can be chosen through the sliding of the second magnet along the circumference.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICABILITY

The magnetic control multi-way valve in the present invention, the up and down sliding of the first magnet is controlled through the horizontal sliding of the second magnet, and the on or off of the pressure relief way is controlled through the up and down sliding of the first magnet, and the up and down sliding of the sealing gasket is controlled through the on or off of the pressure relief way, and the on or off of the communication between the outlet and the inlet cavity is controlled through the up and down sliding of the sealing gasket, and then the waterway switch is achieved. The present is provided with smart conception, reasonable design, easy using and manufacturing and good industrial applicability.

What is claimed is:

1. A magnetic control multi-way valve, comprising:
   a fixed unit having an inlet and at least two independent mounting cavities, and an outlet formed at a lower port of the mounting cavity;
   at least two control valves mounted in the mounting cavities respectively, each control valve comprising:
     a spool assembly fixedly arranged in the mounting cavity with a pressure relief way;
     a first magnet connected in the mounting cavity in an up and down sliding manner and being above the spool assembly, and an on or off of the pressure relief way being controlled through the up and down sliding of the first magnet;
     a sealing gasket connected in the mounting cavity in an up and down sliding manner and being below the spool assembly, and the on or off of the communication between the outlet and the inlet cavity is controlled through the up and down sliding of the sealing gasket;
     a first spring arranged between the sealing gasket and the spool assembly; and
     a second spring arranged between the first magnet and the spool assembly; and
   a second magnet connected out of the fixed unit in a horizontal sliding manner, the up and down sliding of the first magnet being controlled through the horizontal sliding of the second magnet.

2. The magnetic control multi-way valve according to claim 1, wherein an end cap adaptive to the pressure relief way is fixedly arranged under the first magnet.

3. The magnetic control multi-way valve according to claim 2, wherein
   the fixed unit comprises a body and a upper cover which are fixedly connected to each other,
   a first cavity is formed between the spool assembly and the seal gasket, and a second cavity is formed between the spool assembly and the upper cover;
   a first water passing hole is opened on the sealing gasket, through which the inlet communicates with the first cavity;
   the pressure relief way penetrating up and down and a second water passing hole penetrating up and down are opened on the spool assembly, and the first cavity communicates with the second cavity through the second water passing hole, and the second cavity is communicated with the outlet through the pressure relief way.

4. The magnetic control multi-way valve according to claim 3, wherein the second magnet is connected on the upper cover in a horizontal sliding manner, and the magnetic pole corresponding to the lower end face of the second magnet is opposite to the magnetic pole corresponding to the upper end face of the first magnet.

5. The magnetic control multi-way valve according to claim 4, wherein a guiding sleeve is arranged under the spool assembly, the upper end of the guiding sleeve is communicated with the pressure relief way, and the sealing gasket receives the guiding sleeve in a sliding manner.

6. The magnetic control multi-way valve according to claim 3, wherein a fixing concave slot adaptive to the first spring is arranged on the sealing gasket, and the first spring is adaptively connected to the fixing concave slot, and the first spring is provided with a inserting end that is inserted into the first water passing hole.

7. The magnetic control multi-way valve according to claim 3, wherein a push button is connected on the upper cover in a horizontal sliding manner and is fixedly connected to the second magnet.

8. The magnetic control multi-way valve according to claim 3, wherein an upward step plane is arranged in the mounting cavity, to which the sealing gasket is corresponding.

9. The magnetic control multi-way valve according to claim 8, wherein a convex ring is convexly arranged on the step plane.

10. The magnetic control multi-way valve according to claim 9, wherein the number of the control valve is two, and the two control valves are respectively mounted in the two mounting cavities which are interval, horizontal, abreast and independent to each other.

* * * * *